United States Patent Office 2,850,107
Patented Sept. 2, 1958

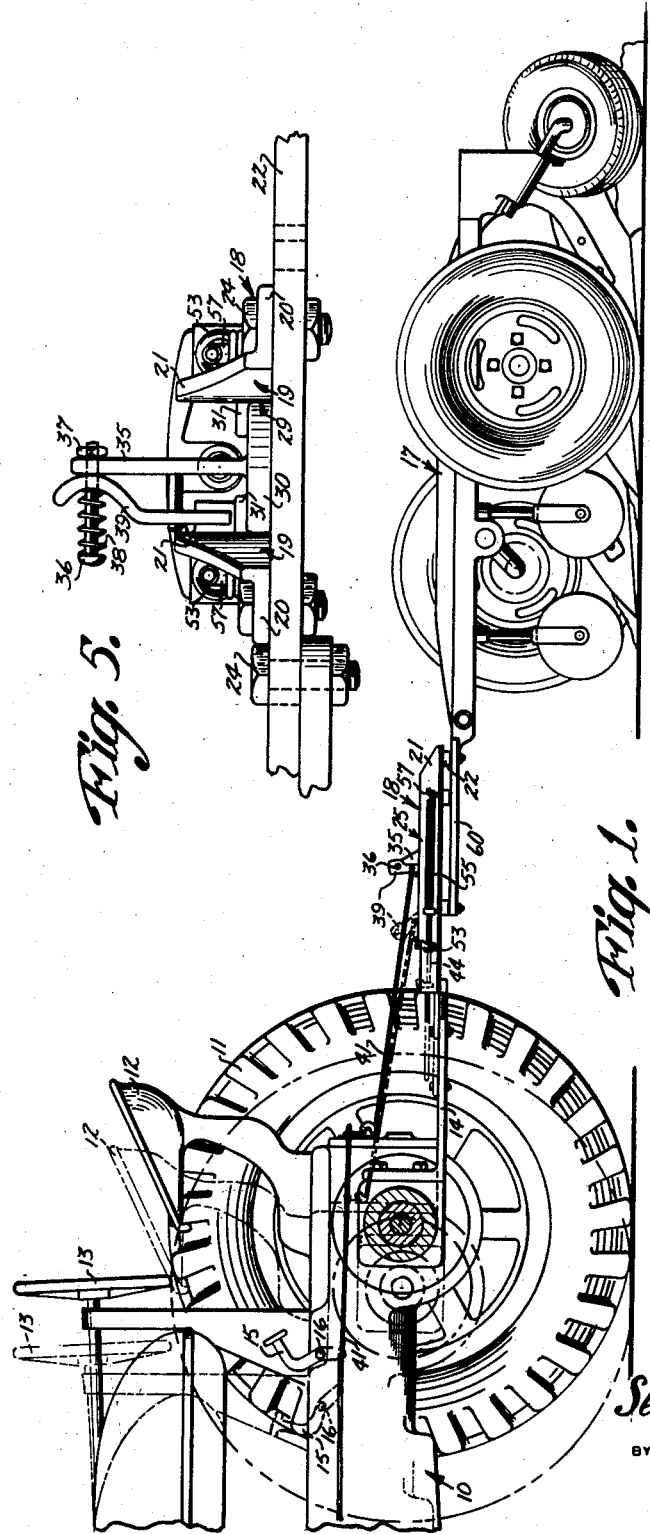

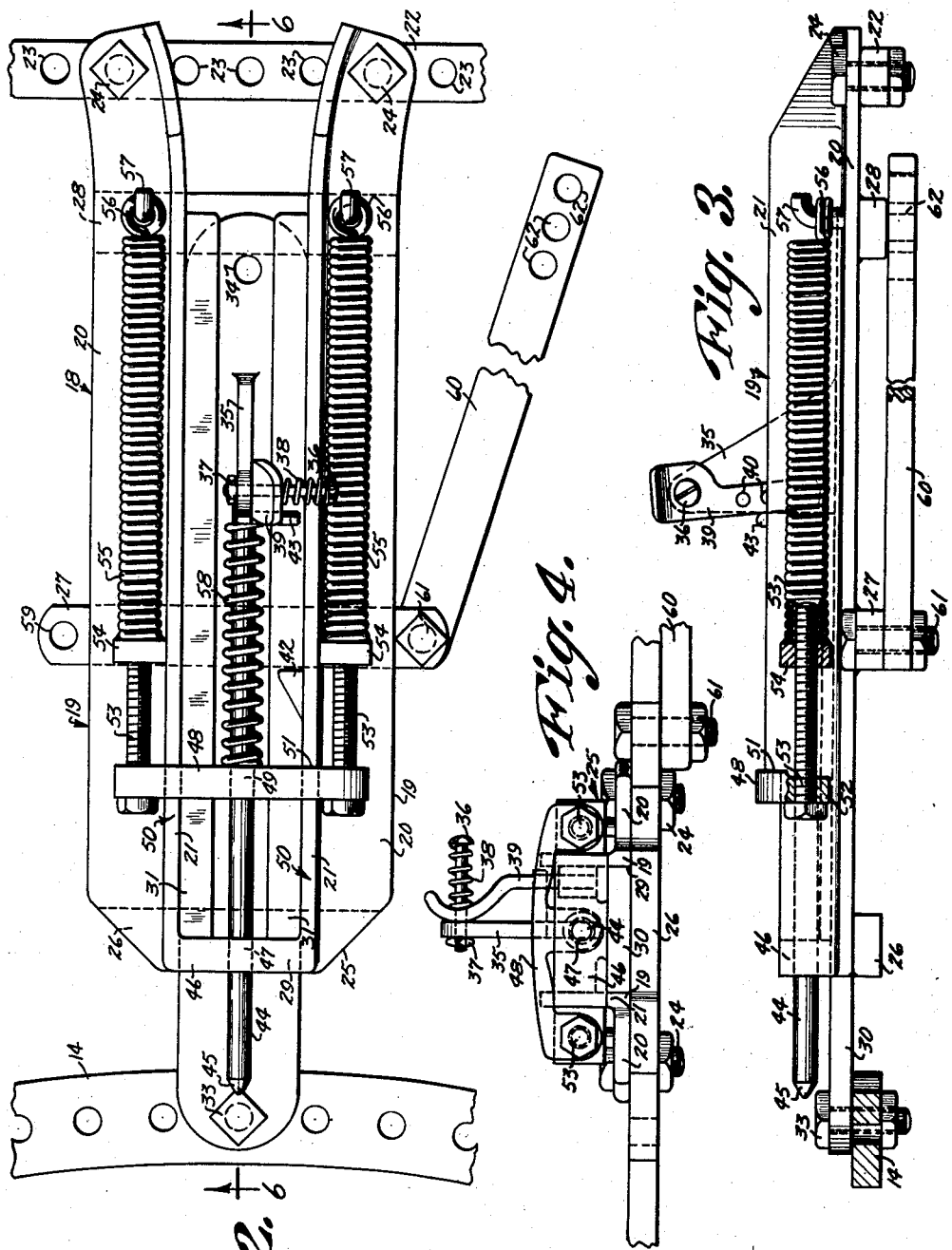

2,850,107

AUTOMATIC SAFETY PLOW HITCH

Sebastian E. Black, New Rockford, N. Dak.

Application January 29, 1957, Serial No. 636,958

3 Claims. (Cl. 180—14.5)

This invention relates to a hitch, and more particularly to a hitch for connecting an implement such as a plow to a towing vehicle such as a tractor.

The object of the invention is to provide a hitch which is adapted to be used for connecting a plow to a tractor whereby in the event that the plow strikes or encounters an obstruction such as a rock, the forward movement of the tractor will be stopped so that damage to the parts will be prevented.

Another object of the invention is to provide a hitch which is adapted to be used for connecting a towing vehicle such as a tractor to an implement such as a plow, the hitch being provided with a plurality of coil springs which will cushion any shock which may result from obstructions that the plow encounters, there being a means for automatically moving the tractor clutch pedal when an obstruction is encountered so that the forward motion of the tractor will be stopped whereby damage to the tractor or plow will be prevented.

A further object of the invention is to provide an automatic safety plow hitch which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view, with parts broken away and in section, illustrating the hitch of the present invention connecting a plow or implement to a towing vehicle such as a tractor.

Figure 2 is a top plan view of the hitch of the present invention.

Figure 3 is an enlarged side elevational view of the hitch, with parts broken away and in section.

Figure 4 is an end elevational view of the hitch.

Figure 5 is an end elevational view of the hitch looking at the opposite end from Figure 4.

Figure 6 is a sectional view taken on the line 6—6 of Figure 2.

Referring in detail to the drawings, the numeral 10 indicates a portion of a conventional towing vehicle such as a tractor which includes the usual rear wheels 11, seats 12, steering wheel 13, and rearwardly extending drawbar 14. The tractor 10 is further provided with a pivotally mounted clutch pedal 15 which may be pivotally mounted on a pivot pin 16, Figure 1. The numeral 17 indicates an implement such as a plow assembly which is being drawn or towed behind the tractor 10, and the present invention is directed to a safety hitch which is indicated generally by the numeral 18. The hitch 18 is construced so that in the event that the plow 17 encounters an obstruction such as a rock, the clutch pedal 15 will be depressed or moved from the solid line position shown in Figure 1 to the dotted line position shown in Figure 1 whereby forward motion or movement of the tractor 10 will be stopped in order to prevent damage to the various parts.

The hitch 18 includes a frame 25 which can be made of any suitable material such as a suitable metal, and the frame 25 includes a pair of spaced parallel beams 19 which each have a substantial L-shape in cross section. Each beam 19 is thus provided with a horizontally disposed leg or base 20 and a vertically disposed side wall or leg 21. Extending across the rear ends of the beams 19 is a body member or bar 22 which is provided with a plurality of spaced apart openings 23. Suitable securing elements such as the bolt and nut assemblies 24 extend through the rear ends of the beams 19 and through certain of the openings 23 for connecting the body member 22 to the rear ends of the beams. The body member 22 is adapted to be connected to the front end of the plow 17 in any suitable manner.

Extending transversely across the lower surfaces of the pair of beams 19 and secured thereto in any suitable manner, as for example by welding, is a plurality of braces such as the braces 26, 27 and 28, Figure 6. There is further provided a pair of elongated ribs 31 which are secured to the inner surfaces of the walls 21 of the beams 19 in any suitable manner as for example by welding, and the pair of ribs 31 co-act with the braces 26, 27 and 28 to define a trackway 29 in which is slidably mounted a bar 30. The front end of the bar 30 is provided with an opening 32 whereby a suitable securing element such as a bolt 33 can be extended through the opening 32 and into engagement with the rearwardly extending member 14 on the tractor 10. An opening 34 may be provided in the rear end of the movable bar 30.

Extending upwardly from the movable bar 30 and secured thereto in any suitable manner, as for example by welding, is a substantially triangular shaped support member 35 which has a pin or bolt 36 extending outwardly from the upper end thereof. A nut 37 is arranged in engagement with an end of the bolt 36 so that the tension of a coil spring 38 on the bolt 36 can be adjusted as desired. Pivotally mounted on the bolt or pin 36 is a trip arm 39, and the trip arm 39 is provided with a plurality of spaced apart openings or apertures 40. A cable 41 has its rear end connected to one of the openings 40 in the trip arm 39, while the front end of the cable 41 is connected to the lower end of the clutch pedal 15 as shown in Figure 1. A pin 43 extends outwardly from the support member 35 and is secured thereto, and the pin 43 serves to limit swinging movement of the trip arm 39 in one direction. There is further provided a stop lug shoulder 42 which is secured to the inner surface of one of the beams 19, and the lug 42 is adapted to engage the lower end of the trip arm 39 so as to trip the arm 39 when the bar 30 moves relative to the beams.

Extending between the front ends of the pair of beams 19 and secured thereto or formed integral therewith is an end piece 46 which is provided with a central opening 47 for the slidable projection therethrough of a guide rod 44, the front end of the guide rod 44 being tapered or pointed as at 45. The rear end of the guide rod 44 is secured as by welding to the front edge of the support member 35.

There is further provided a crosspiece 48 which extends transversely across the pair of beams 19, and the crosspiece 48 is provided with a central opening 49 through which extends the guide rod 44. The upper surfaces of the side walls 21 of the beams 19 are provided with cutouts 50 which define stop shoulders 51 that limit movement of the crosspiece 48 rearwardly.

Arranged in each end of the crosspiece 48 is an opening 52, Figure 3. A bolt 53 extends rearwardly through each opening 52, and the pair of bolts 53 are arranged in threaded engagement with nuts 54. The rear portions of the bolts 53 are arranged in threaded engagement with nuts or securing elements 54. Extending rearwardly of each of the nuts 54 is a coil spring 55, the front ends of the coil springs 55 being secured as by welding to the nuts 54. A loop 56 is arranged on the rear end of each of the coil springs 55, and the loops 56 are arranged in engagement with anchor pins 57 which are secured to the rear portions of the beams 19. A coil spring 58 is circumposed on the guide rod 44, and the coil spring 58 is interposed between the crosspiece 48 and the support member 35, for a purpose to be later described.

The ends of the intermediate brace 27 may project beyond the sides of the beams 19 as shown in Figure 2, and a tie bar 60 may be connected to either end of the brace 27 through the medium of a bolt and nut assembly 61, the bolt and nut assembly 61 extending through an aperture 59 in either end of the brace 27. A tie piece 60 is provided with a plurality of apertures 62 whereby suitable securing elements can extend through the apertures 62 and into engagement with the front portion of the implement 17 being towed.

From the foregoing, it is apparent that there has been provided an automatic safety hitch which is especially suitable for use in connecting an implement such as the implement 17 to a towing vehicle such as the tractor 10. In use the front end of the movable bar 30 is connected to the rearwardly extending member 14 on the tractor 10, by means of the bolt and nut assemblies 33. The body member 22 on the rear end of the hitch is connected to the front portion of the implement 17, and the tie piece 60 extends from one end of the brace 27 to the front portion of the implement 17. A cable 41 has its rear end arranged in engagement with one of the openings 40 in the trip arm 39, and the front end of the cable 41 is connected to the lower end of the pivotally mounted clutch pedal 15, the cable 41 being trained over suitable guide pulleys on the tractor. Then, as long as no obstructions are encountered by the implement 17, the tractor 10 can be used to tow the implement 17 along the field. However, in the event that the implement 17 strikes a rock or other obstruction, then the following sequence of events will take place. The bar 30 will move forwardly and this will carry the support member 35 forwardly, the bar 30 being slidably mounted in the trackway 29 which is formed between the braces and the ribs 31. As the support member 35 moves forwardly, it carries the trip arm 39 forwardly until the lower end of the pivotally mounted trip arm 39 strikes the stop lug 42 whereby the trip arm 39 will be pivoted in a counterclockwise direction from the position shown in solid lines in Figure 1 to the position shown in dotted lines in Figure 1. As the trip arm 39 moves, it moves the cable 41 and this results in pivotal movement of the clutch pedal 15 about the pin 16 so that the clutch pedal 15 will move from the solid line position shown in Figure 1 to the doted line position shown in Figure 1 whereby the tractor 10 will be stopped. Thus, no damage to the tractor, plow or hitch will result when an obstruction is encountered.

The initial shock of an obstruction such as a rock is taken up by the coil springs 58 and 55 so that these springs provide shock absorbers which help cushion the blow so as to provide a highly efficient hitch.

The various parts of the hitch can be adjusted as desired. For example the tension exerted by the coil springs 55 can be changed by rotating the bolts 53. Similarly, the tension of the coil spring 38 against the trip arm 39 can be adjusted by rotating the bolt 36 in the nut 37. The tie piece 60 can be connected to either end of the brace 27 since there are openings 59 in each end of the brace. The body member 22 may be secured to the front portion of the implement 17 in any suitable manner, as for example by means of bolts which extend through the openings 23. A tie piece 60 can also be connected to the front of the implement so as to help steady the implement 17 as it is being towed.

The plow hitch of the present invention thus constitutes a safety connection between the tractor and the plow whereby breakage to the plow will be prevented in the event the plow strikes a rock or other solid substance in the soil. Furthermore, the hitch can be readily attached to or detached from the tractor and plow. In use, the hitch is connected to the plow drawbar while the other end of the member 30 is connected to the drawbar on the tractor. The hitch is adjustable so that it can be readily adapted to various types of tractors or any type of plow. In the event the plow comes in contact with a rock, root or other solid object, the three coil springs 55 and 58 will first absorb all of the jolt of any such contact and at the same time the tractor clutch pedal 15 is released so that the tractor 10 will immediately stop. Thus, when such an obstruction is encountered, the tractor 10 and its associated parts may travel a distance equal to the space between the solid line position shown in Figure 1 and the broken line position shown in Figure 1 so that the tractor is stopped in a sufficiently short distance to permit any real pull whereby the plow and its associated parts will be prevented from becoming damaged or sprung. The various springs 55 can be adjusted insofar as the amount of tension they exert, by rotating the bolts 53. The coil springs will pull the tractor back into the proper position for plowing and the hitch of the present invention can be used with or without a box car hitch on the implement. The plow 17 is actually pulled by the coil springs which can be quickly adjusted to the proper tension for the particular plow being used. Since the plow is actually pulled by the coil springs, there is sufficient give to insure safe plowing even in the rockiest land. The hitch can be used with either hand or foot clutch controlled tractors of any make or model and can also be used on any type of plow.

The loops or eyes 56 on the other ends of the springs 55 fit over the anchor pins 57 which extend upwardly from the beams 19. The side draft control rod or tie piece 60 has its front end anchored to the brace 27 by means of the bolts 61. The other end of the tie piece 60 is adjustable by means of the plurality of openings 62 and is secured to the plow drawbar so as to control side draft. As previously described, the tie piece 60 can be arranged on either side of the hitch. The body member 22 is provided with a plurality of openings 23 so that a further adjustment is possible here. The clutch release arm 39 is mounted for swinging movement about the pin 36 and the cable 41 leads from the trip arm 39 to the tractor clutch whereby the tractor clutch will be disengaged when the arm is tripped by the lug 42 as when a rock or the like is encountered by the plow. The support member 35 may be welded to the bar 30, the bar 30 being mounted for travel in the trackway 29. The crosspiece 48 or guide 48 is movable and has the bolts 53 extending therethrough as well as the rod 44, the rod 44 being slidably mounted in the opening 49 in the center of the crosspiece 48. The bar 30 is the main pull bar and one end thereof hooks on the tractor while the other end may be connected to the box car blow hitch in the event such a hitch is used. The main frame 25 may consist of a pair of beams or channel members 19 to which the other parts are secured.

I claim:

1. In combination, a towing vehicle including a pivotally mounted clutch pedal, an implement arranged rearwardly of the towing vehicle, an automatic safety hitch connecting said implement to said towing vehicle, said hitch comprising a frame including a pair of spaced parallel beams of L-shape in cross section, a body member extending across the rear ends of said beams and connected thereto, said body member being connected to the implement being towed, each of said beams including a horizontally disposed base and a vertically disposed side wall, a pair of spaced parallel longitudinally extending ribs secured to the inner surfaces of the side walls of the beams, a plurality of spaced parallel braces extending transversely across the lower surfaces of said beams and secured to said beams, said braces coacting with said ribs to define a trackway, an elongated bar slidably mounted in said trackway and having its front end connected to the rear of the towing vehicle, a triangular shaped support member extending upwardly from said bar and secured thereto, a movable trip arm arranged contiguous to said support member and provided with a plurality of spaced apart openings, a cable extending from one of said last named openings and connected to the lower end of the clutch pedal, an adjustable bolt pivotally connecting said trip arm to the upper end of said support member, a coil spring circumposed on said bolt and abutting said trip arm, a horizontally disposed pin extending outwardly from said support member for engagement with said trip arm, a stop lug secured to one of said beams for selectively engaging said trip arm, an end piece extending between the front ends of the walls of said beams and secured thereto and provided with a central opening, a guide rod having its rear end secured to said support member and projecting through said last named opening, a movable crosspiece extending transversely across the upper portions of said beams, a coil spring circumposed on said guide rod and interposed between said crosspiece and support member, the side walls of said beams being provided with cutouts defining shoulders for limiting rearward movement of said crosspiece, a pair of adjustable bolts extending rearwardly through the ends of said crosspiece, securing elements adjustably connected to the rear ends of said last named bolts, and a pair of spaced parallel coil springs each having their front end secured to said securing elements and their rear ends anchored to the bases of said beams.

2. An automatic safety plow hitch comprising a frame embodying a pair of spaced parallel beams each having a substantial L-shape in cross section, a body member extending across the rear ends of said beams and connected thereto, each of said beams including a horizontally disposed base and a vertically disposed side wall, a pair of spaced parallel longitudinally extending ribs secured to the inner surface of the side walls of the beams, a plurality of spaced parallel braces extending transversely across the lower surface of said beams and secured to said beams, said braces coacting with said ribs to define a trackway, an elongated bar slidably mounted in said trackway, a triangular shaped support member extending upwardly from said bar and secured thereto, a movable trip arm arranged contiguous to said support member and provided with a plurality of spaced apart openings, a cable extending from one of said last named opennigs, an adjustable bolt pivotally connecting said trip arm to the upper end of said support member, a coil spring circumposed on said bolt and abutting said trip arm, a horizontally disposed pin extending outwardly from said support member for engagement with said trip arm, a stop lug secured to one of said beams for selectively engaging said trip arm, an end piece extending between the front ends of the walls of said beams and secured thereto and provided with a central opening, a guide rod having its rear end secured to said support member and projecting through said last named opening, a movable crosspiece extending transversely across the upper portions of said beams, a coil spring circumposed on said guide rod and interposed between said crosspiece and support member, the side walls of said beams being provided with cutouts defining shoulders for limiting rearward movement of said crosspiece, a pair of adjustable bolts extending rearwardly through the ends of said crosspiece, securing elements adjustably connected to the rear ends of said last named bolts, and a pair of spaced parallel coil springs each having their front end secured to said securing elements and their rear ends anchored to the bases of said beams.

3. In combination, a towing vehicle including a pivotally mounted clutch pedal, an implement arranged rearwardly of the towing vehicle, an automatic safety hitch connecting said implement to said towing vehicle, said hitch comprising a frame, a body member connected to the rear end of said frame, said body member being connected to the implement being towed, said frame defining a trackway, an elongated bar slidably mounted in said trackway and connected to the towing vehicle, a support member extending upwardly from said bar and secured thereto, a movable trip arm having a plurality of spaced apart openings, contiguous to said support, a cable selectively connected to said arm and said clutch pedal, means adjustably connecting said trip arm to said support member, a coil spring on said last said means abutting said trip arm, means extending from said support member for engagement with said trip arm, stop means on said frame for engagement with said trip arm, an end piece on said frame having an opening therein, a guide rod connected to said support member and extending through said last said opening, a movable crosspiece on said frame, a coil spring on said guide rod positioned between said crosspiece and support member, shoulders in said frame for limiting rearward movement of said crosspiece, adjustable means extending through said crosspiece, securing elements connected to said last said means and a pair of coil springs connected to said securing elements and said frame.

References Cited in the file of this patent

UNITED STATES PATENTS

| 1,322,661 | Wagner | Nov. 25, 1919 |
| 1,417,344 | Newman | May 23, 1922 |
| 1,589,061 | Firari | June 15, 1926 |
| 2,151,207 | Hilde | Mar. 21, 1939 |
| 2,284,145 | Hansmann | May 26, 1942 |